United States Patent [19]
Umeda

[11] 4,114,232
[45] Sep. 19, 1978

[54] CASTER WITH BRAKING MECHANISM

[75] Inventor: Katsuhiko Umeda, Kodaira, Japan

[73] Assignee: Shin Nihon Koku Seibi K.K., Tokyo, Japan

[21] Appl. No.: 856,817

[22] Filed: Dec. 1, 1977

[51] Int. Cl.² ............................................. B60B 33/00
[52] U.S. Cl. .................................. 16/35 R; 188/1 D
[58] Field of Search ............ 18/35 R, 35 D; 188/1 D; 280/33.99 C

[56] References Cited
U.S. PATENT DOCUMENTS
3,409,105  11/1968  Clinton ........................... 16/35 R X FOREIGN PATENT DOCUMENTS
1,377,155  12/1974  United Kingdom ................... 188/1 D Primary Examiner—Dorsey Newton
Attorney, Agent, or Firm—Beveridge, DeGrandi, Kline & Lunsford

[57] ABSTRACT

Rolling and swiveling movements of a caster are simultaneously braked by a movable brake member which extends between the forked legs of the caster and has one end downwardly movable into frictional contact with the tread surface of the caster wheel and another end downwardly movable into frictional contact with an upwardly-facing annular surface on the non-swiveling base of the caster. The brake member is moved to its braking position by a lever-actuated pin concentric with the swivel axis.

7 Claims, 5 Drawing Figures

CASTER WITH BRAKING MECHANISM

BACKGROUND AND SUMMARY

This invention relates to casters and concerns in particular the braking device for casters for carts, wagons and the like used aboard passenger-carrying vehicles such as jet planes, railroad cars and ships.

A conventional caster consists of a rotary thrust bearing secured to the cart, a wheel for rolling on the floor, and a generally curved fork connected to the thrust bearing and holding the wheel axle by its bifurcated ends. The fork and wheel as one are capable of swiveling motion around the center of rotation of the thrust bearing. Means are also provided for braking the wheel. The fork is so curved that the wheel axis is not directly under the center of the bearing but is offset therefrom. Due to this offset relationship, movement of the cart causes the fork to swivel to turn and bring the wheel to the trailing side of the cart. There is, however, no means of braking this swiveling motion.

When a cart equipped with conventional casters is in service aboard an airliner, and is at standstill in braked condition, its casters are all oriented in a direction on the trailing side of the previous direction of cart movement. When the plane banks, the cart experiences a push exerted by by the floor and, depending on the direction of this push relative to the orientation of the casters, the casters may swivel to reorient themselves, causing the cart to jog or jolt. When the plane rocks or pitches, the cart may shake or sway to and fro, forcing the articles on it to rattle or even spill liquid contents. The present invention purports to prevent such jogging, jolting and shaking motions of the cart by providing a novel means by which a braking force can be simultaneously applied to the wheel and to the thrust bearing.

According to the present invention, a caster is provided with a brake member which extends between the forked legs of the caster and serves simultaneously to brake the caster wheel and oppose the swiveling tendency of the caster fork. The brake member has one end for frictionally engaging the caster wheel to prevent rolling movement and another end for frictionally engaging an annular surface attached to the caster base to prevent swiveling movement. An actuator is provided for moving the brake member to and from its braking position.

The details of the braking device according to my invention will be made clear from the preferred embodiment thereof described below and illustrated in the attached drawings.

DESCRIPTION OF A PREFERRED EMBODIMENT

Figure 1:
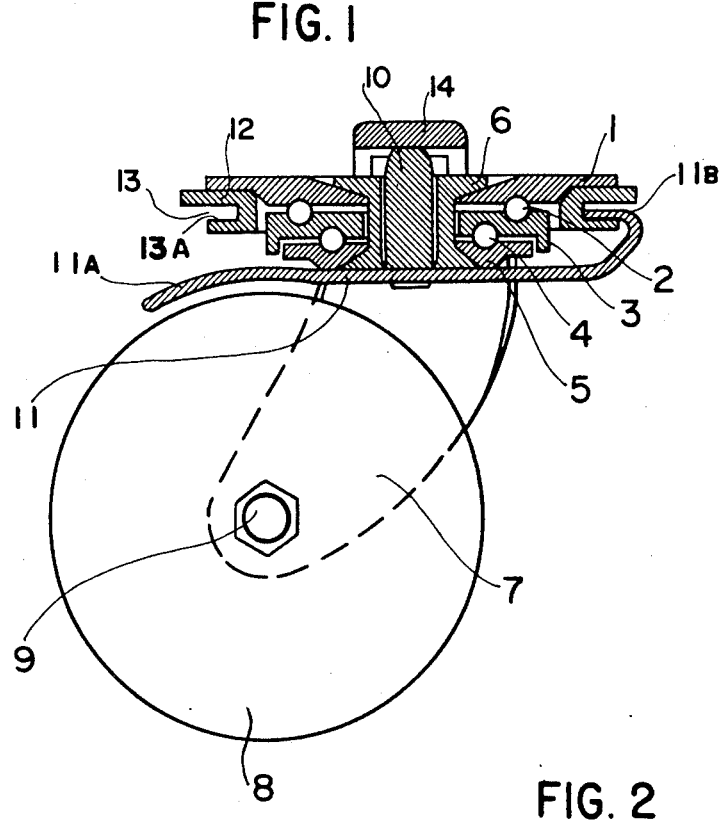
FIG. 1 is a side view of a preferred embodiment of the caster according to the invention, with the bearing and brake member shown in section.
Figure 2:
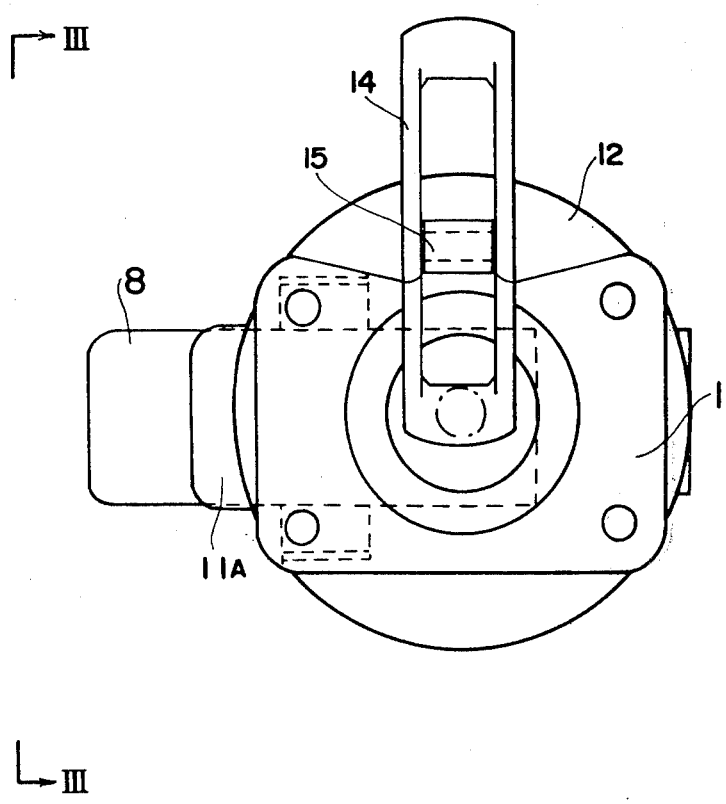
FIG. 2 is a plan view of the caster of FIG. 1.
Figure 3:
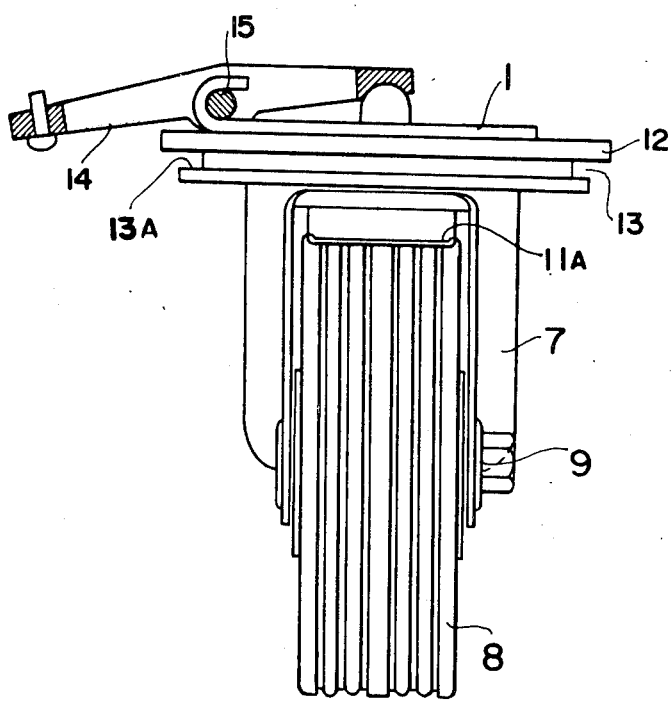
FIG. 3 is a side view shown from the arrow III—III in FIG. 2.
Figure 4:
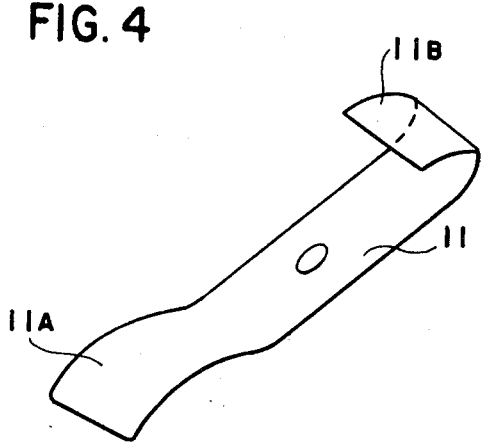
FIG. 4 shows the brake member in perspective.

Referring to FIGS. 1, 2 and 3, a rotary thrust bearing is of the ball type and has two circular rows of steel balls 2 and 4 and five concentric elements described below, each having a circular hole at its center. These elements are: a base 1 to be bolted or otherwise secured to the horizontal bottom face of a cart or other body, a first retainer 3 located immediately under base 1 and provided with a race for the row of steel balls 2, a fork 7 having two legs secured rigidly to retainer 3, a ring 12 attached rigidly to the underside of the rim of base 1 and having an annular groove 13 in its outer edge, said goove being horizontal and opening out radially, a flanged vertical bushing 6 filling the center hole space formed by the base 1 and the retainer 3 to rest on and depend from the base 1 by its top flange, and a second retainer 5 located under the retainer 3 and resting on the bottom flange of the bushing 6. Retainer 5 provides a lower race for the row of steel balls 4.

With the exception of bushing 6, the above-named concentric parts are generally flat in section and stacked in such a way that the weight of vertical loads thereon, acting on the base 1, are transmitted downward through the balls 2 and the retainer 3 to the fork 7 whose legs carry the bolt and nut assembly 9 which provide the wheel shaft. The second retainer 5 with the balls 4 facilitates the rotary or swiveling motion of the first retainer 3 and helps maintain the concentricity between the retainer 3 and the base 1. Bushing 6 supports the second retainer 5 by its flange and serves another purpose described below.

As seen in FIG. 1, the flanges of bushing 6 have beveled mating faces but these faces may have other shapes. It is desirable that the inside diameter of the bushing 6, providing a vertical passage 6A, be relatively large; and that the annular groove 13 is deep enough to present a wide upwardly facing annular surface 13A.

As seen in FIGS. 1, 2 and 3, a brake member 11 is a flat strip-like piece with parallel sides, curled over to enter the annular groove 13 at one end. Brake member 11 extends under the thrust bearing and between the two legs fo fork 7 with small side clearances. An end portion 11A of member 11 overlies the tread surface of caster wheel 8, and is preferably provided with a friction lining on its underside. A cylindrical round pin 10, located in the bore of the bushing 6, has its top end held down by a lever arm 14 and its bottom end affixed to the brake member 11. As shown in FIG. 2, the lever arm 14 extends above pin 10 and projects laterally beyond the thrust bearing in such a way that the outer end can be moved up and down. A hinge or fulcrum is provided at an intermediate point lengthwise of the arm 14 by pivot pin 15. When the outer end of the lever arm 14 is pulled up, a downward push will be exerted on the pin 10 with a mechanical advantage dependent on the leverage. The fulcrum arrangement is not limited to the hinge-like construction using the pin 15 but can be devised differently according to any known method.

When the lever 14 is moved to exert a downward push on pin 10, the pin 10 moves end portion 11A of the brake member 11 downwardly from a retracted position to an engaged position where it frictionally bears on the tread surface of wheel 8. At the same time, end portion 11B of brake member 11 is moved from a retracted position to an engaged position where it frictionally engages against the upwardly facing annular surface 13A of the groove 13. Thus, the end portion 11A directly brakes the wheel 8. Frictonal engagement between the end portion 11B and surface 13A prevents the member 11 from being turned by the two legs of fork 7. Since the fork 7 is integral with the first retainer 3 of the thrust bearing, the friction produced by the lever action of the arm 14 at the end portion 11B has the effect of indirectly braking the swiveling tendency of the thrust bearing.

When an airline food and beverage service service cart is fitted with four casters constructed according to this invention, there are four lever arms 14. A single control lever connected to any suitable external linkage may actuate these four arms in the manner explained above, in order to effect the double-action braking simultaneously on all four casters.

Figure 5:
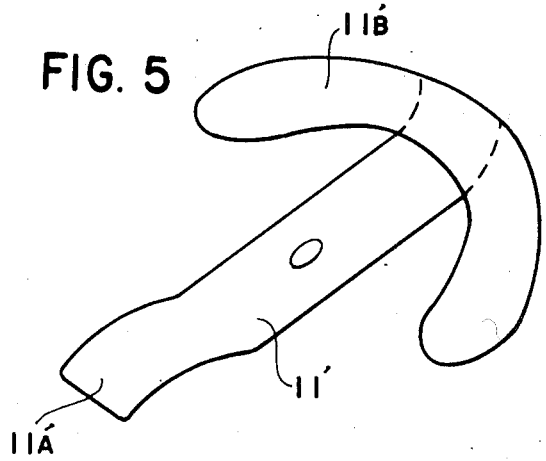
FIG. 5 shows a modified form of the brake member.

The lever arm 14 and the pin 10 may be engaged inseparably or left unengaged but kept in contact with a spring for urging the brake member 11 toward the arm 14. The legs of fork 7 along the sides of shoe 11 should be sufficiently wide in order for the fork 7 to experience a large resistance to swiveling torque when the caster is subjected to reorientation forces. The lengths of the end portions 11A and 11B should be proportioned to give an appropriate balance of frictional forces at end portions 11A and 11B, to produce the desired double-action braking. The brake shoe 11 is shown in FIGS. 1-4 as a strip-like piece with a uniform width but, in order to obtain a larger frictional contact area relative to the bottom side face 13A of groove 13, may be shaped arcuately to form end portion 11C as shown in FIG. 5

It will be seen from the foregoing description that the braking device according to this invention permits the caster as a whole to be frictionally braked merely by operating lever arm 14 to prevent the caster from rolling and swiveling when an external force, due mainly to gravity, acts on the cart. Specifically, a service cart or wagon fitted with the casters of this construction can be readily and effectively restrained and made to stand solidly on a tilting, pitching or rocking floor so that when used to serve passengers in a jet plane, for instance, the flight attendant need not restrain the standing cart at each stop along the aisle. This frees the attendant's hands for handling articles on the cart, and prevent the spillage of liquid and the bouncing and rattling of the cart and its contents.

Persons familiar with this art will realize that the invention may be practiced by many devices other than the specific embodiment disclosed hereinabove. For example, the ball bearing may be eliminated from the thrust bearing and a wide variety of actuating devices may be used. Therefore, it is emphasized that the invention is not limited solely to the disclosed embodiment, but is encompassing of modifications thereto and variations thereof falling within the spirit of the following claims.

I claim:

1. A caster comprising a rotary thrust bearing provided with an upper base member and a lower rotary member, said rotary member being rotatable about an axis with respect to the upper member, means on said base member providing a nonrotatable annular surface concentric with said axis, a two-leg fork rigidly attached to said rotary member, and a wheel rotatable supported at the lower end of said fork between the legs thereof, a vertical pin concentric with said axis, a brake member extending between the legs of the fork under said pin and above said wheel, said brake member having one end portion movable from a retracted position to an engaged position in frictional contact with the wheel, said brake member having another end portion movable from a retracted position into an engaged position in contact with said annualr surface, and a lever arm pivotally supported on the base and havng an outer end extending outwardly beyond the base and an inner end located directly above the pin, said lever arm being movable to depress said pin whereby said pin moves said brake member to shift said end portions to said engaged positions.

2. The caster of claim 1, in which said another end portion of the brake member extends arcuately along said annular surface.

3. The caster of claim 1 wherein said annular surface faces upwardly.

4. The caster of claim 1 wherein the means for providing said annular surface is a ring rigidly attached to said base and provided with an edge which has a peripheral groove forming said annular surface.

5. The caster of claim 4 wherein said annular surface faces upwardly.

6. The caster of claim 4, in which said another end portion of the brake member extends arcuately along said annular surface.

7. The caster of claim 6 wherein said annular surface faces upwardly.

* * * * *